FRANCIS T. BUCKLEY
IRA L. SELDIN
ROGER B. WOJCIK

INVENTORS

BY

ATTORNEY

Dec. 18, 1962   F. T. BUCKLEY ET AL   3,069,301
HEAT-REFLECTING LAMINATES
Filed Dec. 12, 1958

FRANCIS T. BUCKLEY
IRA L. SELDIN        INVENTORS
ROGER B. WOJCIK

BY

ATTORNEY

United States Patent Office 3,069,301
Patented Dec. 18, 1962

3,069,301
HEAT-REFLECTING LAMINATES
Francis T. Buckley, Ludlow, Ira L. Seldin, Springfield, and Roger B. Wojcik, Wilbraham, Mass., assignors to Monsanto Chemical Company, St. Louis, Mo., a corporation of Delaware
Filed Dec. 12, 1958, Ser. No. 779,900
8 Claims. (Cl. 154—2.77)

The present invention relates to laminates and more particularly to light-transmitting laminates exhibiting low heat transmission.

To reduce the transmission of radiated heat through fenestrations designed for use in buildings and vehicles, it has been common practice to provide them with a layer of metal or other heat-reflecting material. The effect is that of a semitransparent mirror, which in addition to reflecting heat also reflects light and does so at both surfaces. Consequently if light from a secondary source strikes their inner surfaces it will occasion discomfort in the form of undesirable glare to occupants of the building or vehicle. In this regard, the secondary source can be solar light introduced through other fenestrations located in the building or vehicle or can be a separate illuminating source located within.

Accordingly it is a principal object of the present invention to provide a light-transmitting laminate capable of reflecting radiated heat at one surface but which exhibits minimum light reflection at the opposite surface.

Other objects of the invention will in part be obvious and will in part appear hereinafter.

These and other objects of the present invention are attained in a pellucid (transparent or translucent) laminate comprising a pair of panels having interposed a heat-reflecting medium and a light-absorbing medium which are effectively presented to opposite surfaces of said laminate.

The following drawings are included to illustrate the present invention as well as to indicate the benefits derived therefrom:

The laminates of the present invention are preferably of rigid construction, attained by using rigid panels which are resistant to scratching and essentially nonhydroscopic in nature. It is also possible to have flexible laminates using flexible panels throughout the laminate. As a further variation, it is possible to combine a rigid panel and a flexible panel to form the desired laminates. The panels themselves are solid in nature, and can be clear or tinted, as well as transparent or translucent in nature. Illustrative of the materials from which the panels can be constructed are glass, synthetic plastic materials, both thermoplastic and thermoset in nature, such as polymethyl methacrylate, polystyrene, polyvinyl chloride, polypropylene, polyethylene terephthalate, cellulose acetate, cellulose nitrate and the like.

In providing the heat-reflecting medium, materials which can be used include metals such as aluminum, copper, chromium, gold, silver, rhenium, rhodium, titanium, etc., also alloys or mixtures of the preceding in addition to certain oxides and salts of the preceding such as rhenium trioxide, titanium dioxide and the like. Other materials which contribute satisfactory heat-reflecting films are certain polymethine dyes, etc.

Light-absorbents which can be used in the formation of light-absorbing medium include pigments such as carbon black, copper phthalocyanine, dibenzanthrone, alizarine cyanine green, indanthrone, chlorinated copper phthalocyanine and others, as well as dyestuffs containing 2 to 4 cyclic nuclei in the color molecule of the type disclosed and claimed in U.S. 2,739,080. The latter include certain azo-type dyes illustrated by Kohnstamm Orange, Oil Yellow (Calco), substituted anthraquinones such as Plasto Violet (National Aniline), etc., and mixtures of the same.

To provide lamination between the various components, more particularly panels and media, it is recommended that an adhesive be used. These of necessity are pellucid in nature. Adhesives provided from thermoplastic and thermosetting polymeric materials such as epoxides, polyvinyl butyral (plasticized), ethylene-vinyl acetate, hydrolyzed ethylene-vinyl acetate, silicon polymers, cellulose acetate, as well as natural polymers such as rubber latices having sufficient optical clarity, can be used. The choice will depend upon the adhesion qualities of the adhesive as being suited to the process chosen for assembling the laminates, as well as the optical qualities of the adhesive. More particularly, plasticized polyvinyl butyral is recommended for use as the adhesive.

Figure 1:
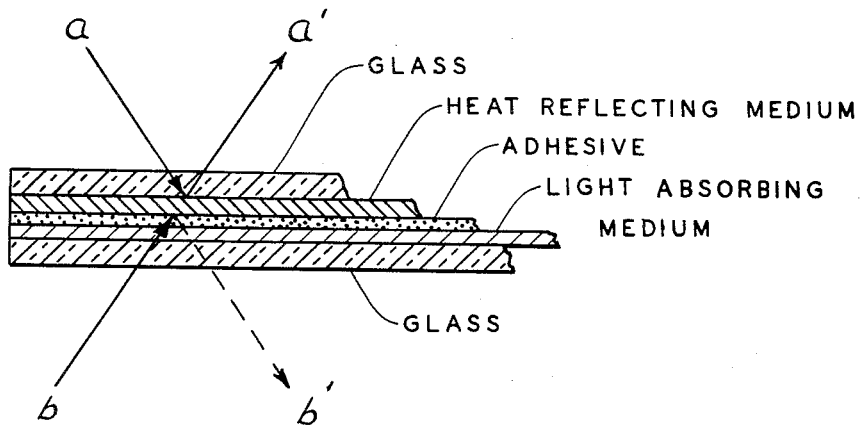
FIG. 1 is a schematic front elevation of a pellucid laminate representing one embodiment of the present invention.
Figure 2:
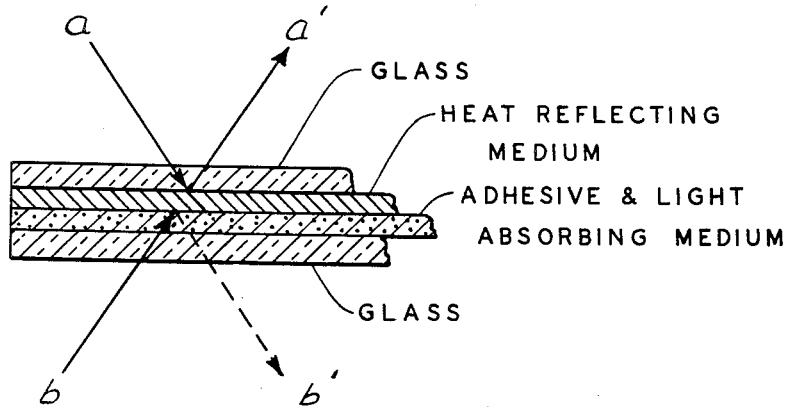
FIG. 2 is a schematic front elevation of a pellucid laminate representing a second embodiment of the present invention.
Figure 3:
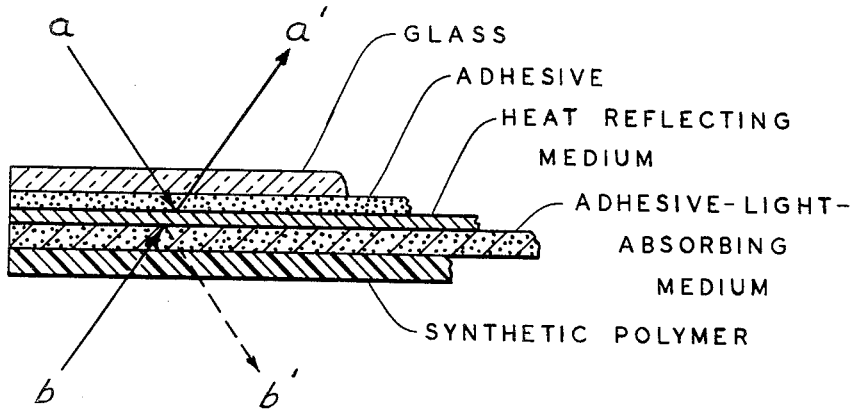
FIG. 3 is a schematic front elevation of a pellucid laminate representing a third embodiment of the present invention.
Figure 4:
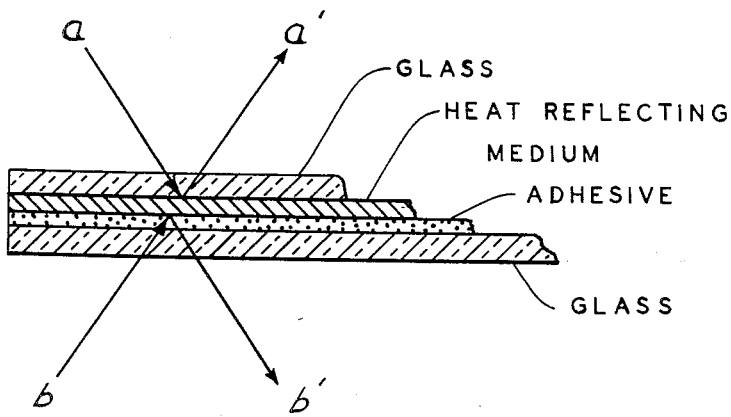
FIG. 4 is a schematic front elevation of a pellucid laminate with which to compare the pellucid laminates of the present invention.

The laminates of the present invention can be assembled in a variety of orders, some of which are illustrated in FIGS. 1–3. In any case, the heat-reflecting medium is effectively presented to one surface of the laminate product while the light-absorbing medium is effectively presented to the opposite surface of the laminate product. As indicated in FIGS. 1 and 2, the heat-reflecting medium, more particularly a metal film, can be directly interposed between one of the glass panels and a layer of adhesive, while in FIG. 3 the heat-reflecting medium is shown interposed directly between two layers of adhesive. It is also possible to deposit the heat-reflecting medium on a synthetic plastic substrate such as polyethylene terephthalate or the like and then be interposed as indicated.

When the heat-reflecting medium is to be a metal film, vacuum deposition of a thin film of the metal onto one panel, a layer of adhesive or a substrate of synthetic plastic can be practiced. If the expedient of vacuum depositing a heat-reflecting film onto the adhesive layer or onto the plastic substrate is used, it is recommended that a thin layer of adhesive such as polyvinyl butyral be interposed between the metal so deposited, and the surface of the panel, particularly if the latter is glass, to which it is ultimately to be contacted on assembly, as illustrated in FIG. 3. Deposition of the heat-reflecting material onto the various panels and layers from solutions, suspensions and the like can also be used successfully to provide heat-reflecting media.

Thickness of the heat-reflecting medium should be such that substantial reflection of heat radiated from a source ($a$), such as the sun is effected (see any of the FIGS. 1–4). Reflection of the desired type is indicated by the solid line pointing to objective ($a'$). Coincidentally, the heat-reflecting medium should be of such thickness as allows transmission of light, in order that the laminate be pellucid in nature. In the case of metal films, those having a thickness of greater than infinitesimal and up to about 600 A. are quite satisfactory. The choice of materials, metals and others, going into formation of the heat-reflecting medium can be varied in accordance with the optical effects desired, more specifically in accordance with the desired color of the light transmitted by them.

The light-absorbing medium can be provided in the assembly prior to lamination by various practices. When the light-absorbent material is a pigment it is recommended that it be colloided into a portion of adhesive material, the latter then can act incidentally as at least a temporary support for the light-absorbent materials. The pigment should be uniformly and discretely dispersed throughout the adhesive to produce a light-absorbing medium exhibiting uniform light absorption. In facilitating this, the pigment should be comminuted to a particle size of about 0.4 micron or less prior to blending with the adhesive. The blended material can then be extruded or cast into a film or layer to serve as a light-absorbent medium. When the light-absorbent material is a dyestuff it is preferably deposited from solution onto a layer of adhesive. When the adhesive is a layer of polyvinyl butyral, the dyestuff can be caused to diffuse into the adhesive material by aging under slightly heated conditions. Additional adhesive, beyond that which has been used to incorporate the absorbent material to and so form the light-absorbent light medium, can be used to further insure complete lamination between the components of the laminate. It is also possible to incorporate light-absorbent materials into a material other than those which have been previously designated as adhesives, in order to produce light-absorbent media. To illustrate: it is possible to provide the light-absorbing medium, at least in part in synthetic plastic material which latter upon being cast into a sheet can also serve as that panel to be located at that surface of the laminate which is to present the light-absorbing medium. Other methods which can be used successfully in forming the light-absorbing medium include brushing, coating, etc. of the light-absorbent material with or without a vehicle including an adhesive, onto a preformed adhesive or directly onto the panel designed to be located at the surface of the laminate which presents the light-absorbing medium.

A minimum amount of adhesive is suggested for use. It need only be sufficient to give secure adhesion between the various laminae. Using plasticized polyvinyl butyral as the adhesive, a thickness of 10–60 mils, and more particularly about 15 mils, is preferred in forming laminates of the type shown in FIGS. 1 and 2. Under any circumstance it is prescribed that the light-absorbing medium together with the adhesive and the panel located to that side of the laminate where glare is to be minimized, should have a total light absorption of 22% to 95% of visual radiations.

When the various components have been assembled as illustrated in FIGS. 1–3, they can be consolidated into a laminate product as by the use of pressure, and heat when the choice of adhesive calls for the use of same. In a preferred embodiment using plasticized polyvinyl butyral as the adhesive, a temperature of 120° C. to 140° C. and a hydraulic pressure of 170 to 190 lbs./in.$^2$ as provided in an autoclave contributes acceptable laminate products.

The following examples are given in illustration of the present invention. Where parts are mentioned, parts by weight are intended unless otherwise prescribed.

EXAMPLE I

A light-transmitting laminate which is to serve as a control is provided in the following manner: a 1/8 inch-thick glass plate is placed in a vacuum-coating apparatus. During evacuation of the apparatus, glow discharge is utilized to prepare one surface of the plate for deposition. After a vacuum of about 0.1 micron Hg has been attained, a film of about 300 A. of aluminum is deposited onto the prepared surface of the plate. The metallized glass plate is then removed from the vacuum coating apparatus. A 15 mil sheet of polyvinyl butyral is placed over the film, and another 1/8 inch plate of glass superimposed thereon. The assembly is given a preliminary lamination by subjecting it to a uniform pressure of 130 p.s.i. at 140° C. for a period of 90 seconds in a flat bed press. This is followed by placing the assembly in an oil-autoclave and subjecting it to a hydraulic pressure of 170–190 p.s.i. and a temperature of 120–140° C. for a period of 7 minutes.

EXAMPLE II

The procedure of Example I is followed with the exception that the 15 mil sheet of polyvinyl butyral has been previously mass-pigmented with carbon black. Mass-pigmentation is attained by colloidally dispersing .035 part of carbon black having a particle size of less than about 0.4 micron into 100 parts of plasticized polyvinyl butyral, followed by extrusion of the product into a 15 mil sheet.

EXAMPLES III–VII

The procedure of Example II is again followed to provide light-transmitting laminates. The heat-reflecting films are of slightly different thicknesses and their compositions are as follows:

III. Copper
IV. Silver
V. Gold
VI. Copper-chromium alloy
VII. Chromium with copper overlay Each of the laminates provided in accordance with Examples I–VII set forth above are subjected to test procedures by which to measure heat-reflection at both surfaces. To do so a recording spectrophotometer effectively measuring radiations of from 400 m$\mu$ to 1000 m$\mu$ wavelengths is used. The indicated spectrum includes about 75% of total solar radiated energy. The test results are given in the following table:

Table I

| Sample | Reflection, Percent First Surface | Reflection, Percent Second Surface |
| --- | --- | --- |
| I (Control) | 60.5 | 60.5 |
| II (Al) | 60.5 | 13.0 |
| III (Cu) | 71.0 | 15.5 |
| IV (Ag) | 26.0 | 8.0 |
| V (Au) | 72.5 | 16.5 |
| VI (Cu-Cr) | 59.5 | 20.0 |
| VII (Cu-Cr) | 54.0 | 28.0 |

The results set forth in Table I indicate that the use of a light-absorbing medium in the production of each of the heat-reflecting laminates of the present invention serves to considerably minimize light-reflection or glare at one surface while maintaining heat-reflection at the opposite surface. The results above are graphically shown in the accompanying drawings. The laminates of the present invention, embodiments of which are contained in FIGS. 1–3 are characterized by substantial lessening of reflected light at the one surface in which light emanating from secondary source (b) is reflected in far less magnitude as indicated by the broken line pointing toward objective (b'), the result of a substantial quantity of this light being absorbed by the light-absorbing medium. The laminate shown in FIG. 4, which is illustrative of sample I above, indicates by the solid line directed to objective (b') that reflection from a secondary source (b) has not been appreciably diminished. In all cases heat-reflection at the opposite surface is equally effective as illustrated by the solid lines directed from primary sources (a) to the laminates, and from the laminates to the objects (a').

Laminates of the type produced by Examples I–III, when installed in skylights and windows of buildings with their light-absorbing media presented inwardly, contribute greatly to the comfort of occupants by reducing the transmission of radiated heat into the buildings.

In addition, secondary sources of light, such as electric lights, located within the building do not occasion objectionable reflection or glare from the inner surfaces of skylights and windows so installed. Consequently, viewing through the same by the occupants is not uncomfortable.

It will thus be seen that the objects set forth above among those made apparent from the preceding description and since certain changes can be made in carrying out the above process and in the laminate products without departing from the scope of the invention, it is intended that all material contained in the above description shall be interpreted as illustrative and not in a limiting sense.

What is claimed is:

1. A pellucid laminate which effectively presents a heat-reflecting medium and a light-absorbing medium to opposite sides thereof comprising a pair of pellucid panels interposing (a) a metal film and (b) an adhesive layer of polyvinyl butyral having a light-absorbing material incidental thereto.

2. A pellucid laminate according to claim 1 wherein the light-absorbing material is dispersed throughout the adhesive layer.

3. A pellucid laminate according to claim 1 wherein the light-absorbing material is deposited on the surface of said adhesive layer.

4. A pellucid laminate according to claim 1 wherein the panels comprise glass.

5. A pellucid laminate according to claim 1 wherein the heat-reflecting medium comprises a metal film the metal being selected from the class consisting of aluminum, copper, chromium, gold, silver, rhenium, rhodium, titanium, and mixtures of the same.

6. A pellucid laminate according to claim 1 wherein the light-absorbing medium has adhesive in admixture therewith.

7. A pellucid laminate according to claim 1 wherein the light-absorbing medium contains a light-absorbing compound selected from the class consisting of dyestuffs, pigments and mixtures of the same.

8. A pellucid laminate according to claim 7 wherein the light-absorbent is carbon black.

References Cited in the file of this patent

UNITED STATES PATENTS

| | | |
|---|---|---|
| 1,176,313 | Pfund | Mar. 21, 1916 |
| 1,990,143 | Snow | Feb. 5, 1935 |